(12) United States Patent
Jollota et al.

(10) Patent No.: US 7,076,274 B2
(45) Date of Patent: Jul. 11, 2006

(54) METHOD AND SYSTEM FOR INDICATING LINK QUALITY AMONG NEIGHBORING WIRELESS BASE STATION

(75) Inventors: James M. Jollota, Simi Valley, CA (US); Duke Kamstra, Thousand Oaks, CA (US)

(73) Assignee: Strix Systems, Inc., Westlake Village, CA (US)

( * ) Notice: Subject to any disclaimer, the term of this patent is extended or adjusted under 35 U.S.C. 154(b) by 253 days.

(21) Appl. No.: 10/701,370

(22) Filed: Nov. 3, 2003

(65) Prior Publication Data
US 2004/0142699 A1 Jul. 22, 2004

Related U.S. Application Data

(63) Continuation of application No. PCT/US02/13889, filed on May 2, 2001.

(60) Provisional application No. 60/288,300, filed on May 2, 2001.

(51) Int. Cl.
*H04B 1/38* (2006.01)
*H04Q 7/20* (2006.01)

(52) U.S. Cl. ............... 455/561; 455/566; 455/423; 455/67.11; 455/446

(58) Field of Classification Search ............... 455/561, 455/560, 67.11, 67.7, 426.2, 7, 9, 11.1, 41.2, 455/41.3, 507, 508, 566, 226.1–226.4, 423–425, 455/446, 448, 449
See application file for complete search history.

(56) References Cited

U.S. PATENT DOCUMENTS

| | | | | |
|---|---|---|---|---|
| 5,802,473 A * | 9/1998 | Rutledge et al. | ............ | 455/446 |
| 6,035,183 A * | 3/2000 | Todd et al. | ............... | 455/226.2 |
| 6,047,177 A * | 4/2000 | Wickman | ................ | 455/422.1 |
| 6,108,536 A * | 8/2000 | Yafuso et al. | ................ | 455/424 |
| 6,208,629 B1 * | 3/2001 | Jaszewski et al. | .......... | 370/329 |
| 6,298,219 B1 * | 10/2001 | Patronen et al. | ............ | 455/424 |
| 6,304,754 B1 * | 10/2001 | DeSantis et al. | ............ | 455/436 |
| 6,308,071 B1 * | 10/2001 | Kalev | .......................... | 455/446 |
| 6,751,457 B1 * | 6/2004 | Martin | ........................ | 455/424 |
| 6,795,689 B1 * | 9/2004 | Ogren et al. | ............. | 455/67.13 |
| 6,850,736 B1 * | 2/2005 | McCune, Jr. | ............ | 455/67.13 |

\* cited by examiner

*Primary Examiner*—Duc M. Nguyen
(74) *Attorney, Agent, or Firm*—Perkins Coie LLP

(57) ABSTRACT

Various aspects of a method and system for indicating the link quality between wireless base station units are presented. The establishment of a wireless network involves the placement of and communication between several base station units. To facilitate the operational capability of such a wireless network, a method for continuously displaying the quality of the links between these base station units is introduced. The method provides each base station with the information necessary to individually display the quality of the links between itself and its neighboring base stations. The displays can take on a variety of formats. Additionally, link quality of neighboring base stations can be collected by a central controller which can process the information and create a grid showing the link quality throughout the wireless network.

26 Claims, 15 Drawing Sheets

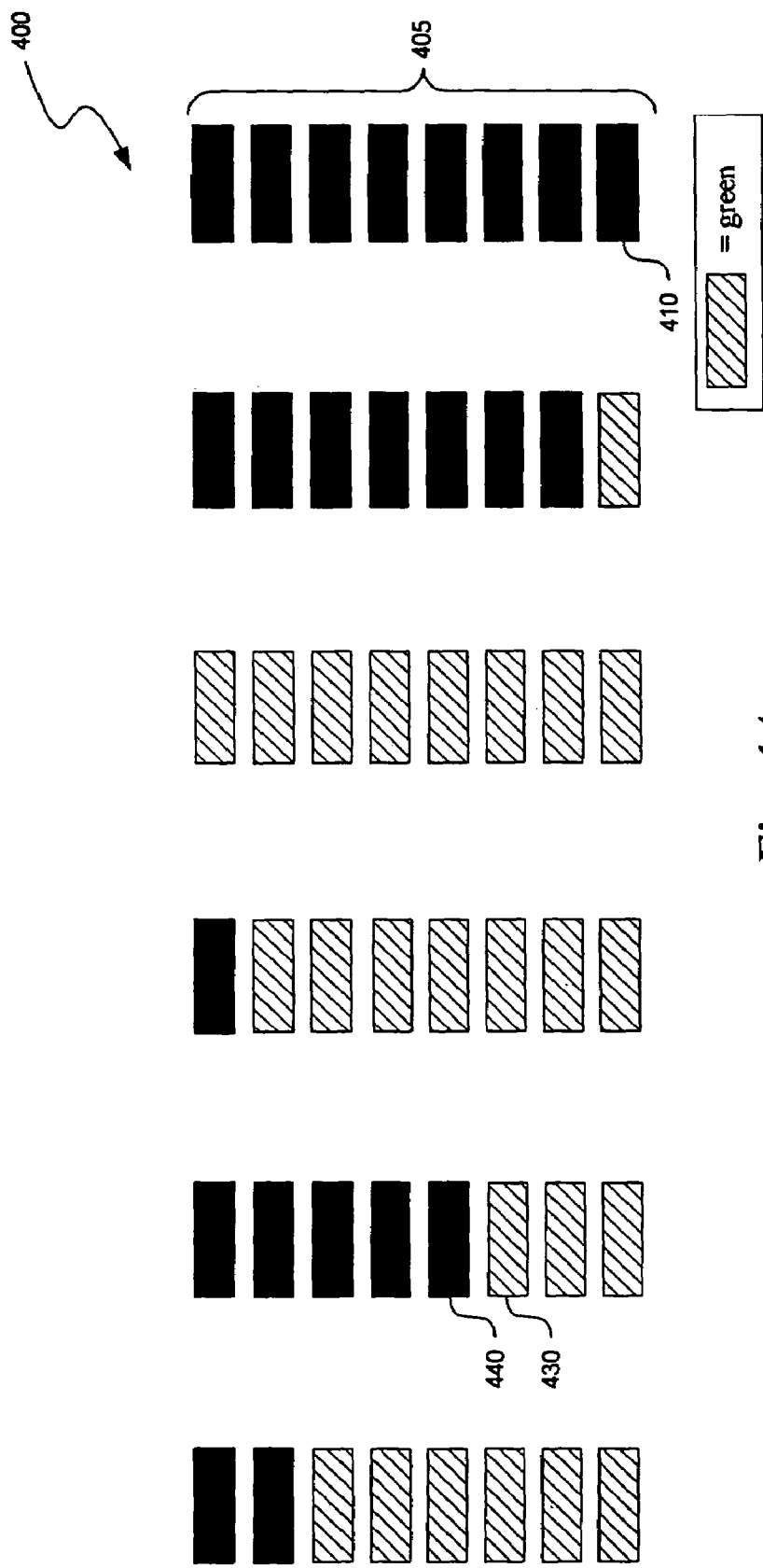

METHOD AND SYSTEM FOR INDICATING LINK QUALITY AMONG NEIGHBORING WIRELESS BASE STATION

CROSS-REFERENCE TO RELATED APPLICATION

This application is a continuation of international application PCT/US02/13889 and claims the benefit of U.S. Provisional Patent Application No. 60/288,300, filed May 2, 2001, both of which are incorporated herein by reference.

TECHNICAL FIELD

The disclosed embodiments relate to wireless systems and more particularly to an indication of the link quality for wireless base stations.

BACKGROUND

Cellular telephones, personal communication service equipment, personal data assistants, and other wireless devices have gained wide scale acceptance in both commercial and personal markets. When using these devices, the quality and clarity of the wireless communications depends greatly upon having adequate signal strength relative to any local interference. Signal strength is a primary factor determining the quality of the link between the mobile unit and a local base station. The versatility of these devices however, lies in their ability to move throughout the working area unimpeded by wires, docking stations, modem connections and the like. This flexibility is founded in the ability of base stations, which are located throughout the working area, to seamlessly transfer the mobile link amongst themselves.

Mobile telephones and other wireless devices are dependent on their link to fixed devices established in a network. This link is accomplished by providing access points, or base station units, that can hand off the connection of mobile devices without an interruption of service. Many problems exist with such wireless networks. Networks often have limited capacity and generally provide only low bandwidth or narrow band access. Even more troubling, the service is frequently unreliable and restricted in areas such as buildings, convention centers, subways, airports, train stations and many commercial enterprises. These restrictions can be due to the inherent physical characteristics of the floors and walls in the building, the building material used to construct the building, or the electromagnetic spectrum associated with operations on-going at those locations. One proposed solution to these limitations and problems has been the development of personal communications networks. Personal communication networks typically have greater bandwidth and possess a higher user capacity, but still face the same problems associated with the physical and operational characteristics of commerce, i.e. buildings and the working environment.

As technology evolved to solve these problems, many businesses installed wireless local area network base stations within their working environment. Current technology requires these base stations, which form a network, to have coverage that overlaps such that it eliminates or minimizes the presence of zones where the coverage capability is so poor that communication is not possible, i.e. dead zones. Such overlaps are a prerequisite for base station-to-base station handoffs without communications on a mobile station being dropped. To accomplish this, each base station is typically given knowledge of base stations to which they can hand off a mobile unit. Typically, a base station controller communicates with base stations and coordinates a hand off of a mobile device. To do so each base station must communicate to the controller the quality of the links between itself and its neighboring base stations. This process is complex and requires significant resources to manage the high volume of handoffs created by the ever increasing number of mobile units. Furthermore, it is difficult to keep on top of the changing local environment, which can affect the coverage and links between base stations.

When installing wireless local area network base stations within a corporate environment, it is necessary to properly locate each base station such that sufficient wireless coverage exists throughout the working area. Typically, this involves analyzing variables such as the corporate floor plan, fixed wall construction, cubicle location and material, as well as what is being done at the location in order to estimate optimal base station placement. Once completed, a technician, generally using portable wireless test equipment, can verify each stations placement and coverage. There are software-based (e.g. AutoCAD) floor plans that can be used for automated analysis, but often the current office floor plan is either not drawn in the software, does not exist, or is inaccurate. Additionally, such programs provide no feedback regarding actual operating conditions. Furthermore, this process, if accomplished at all, typically occurs only during the installation process, and is not repeated unless errors are reported by users that require a service visit, reinstallation of the current base stations or installation of additional base stations. While methods exist to locate and evaluate the link between wireless base stations and mobile units, these devices offer little to no feedback on the links between individual base stations. Examples of such systems can be found in U.S. Pat. Nos. 6,035,183, 5,960,341, 5,602,903, 5,508,707, and 5,675,344 as well as European Patent Application No. EP 1,051,049 A2 and Great Britain Patent No. 2,275,848. These references describe displays that are located on a mobile unit or interface with a central controller to locate a mobile unit but fail to convey the quality of the links between participating base stations.

In each of the forgoing cases, local area network managers cannot on a day-to-day basis monitor the signal strength and quality of links between one base station and its neighbors. As companies and enterprises grow, change, or are replaced, the environment in which they operate changes. Changes in the working environment undoubtedly alter the coverage capability of each base station; yet without repeating the installation process the actual capability is unknown. As a result, users cannot make informed decisions on the reliability of the coverage areas in which they operate mobile units. Lacking such reliability, user confidence regarding mobile devices erodes, thereby defeating the very purpose for such units and decreasing workplace productivity.

BRIEF DESCRIPTION OF THE DRAWINGS

FIGS. 4A–4F show various embodiments of displays depicting link quality between a base station and six (6) neighboring base stations. FIG. 4A shows an embodiment of a display using light emitting diodes orientated vertically. FIG. 4B shows an embodiment of the display shown in FIG. 4A in combination with directional indicators to point to the base stations associated with each light emitting diode bar. FIG. 4C is a color figure showing an embodiment of a link quality display using different color indicators to represent link quality. FIG. 4D is a color figure showing an embodiment of the display shown in FIG. 4C in combination with directional indicators to point to the base stations associated with each color indicator. FIG. 4E shows an embodiment of link quality display using a seven (7) segment light emitting diode array that identifies the base station and provides a numerical indication of the link quality. FIG. 4F is a color figure showing an embodiment of a link quality display using a graphical format.

FIG. 6A shows a grid including three (3) base stations. FIG. 6B shows a grid including four (4) base stations. FIG. 6C shows a grid including seven (7) base stations. FIG. 6D shows a grid containing eleven (11) base stations. FIG. 6E shows a complete network grid of fourteen (14) base stations.

Figure 1:
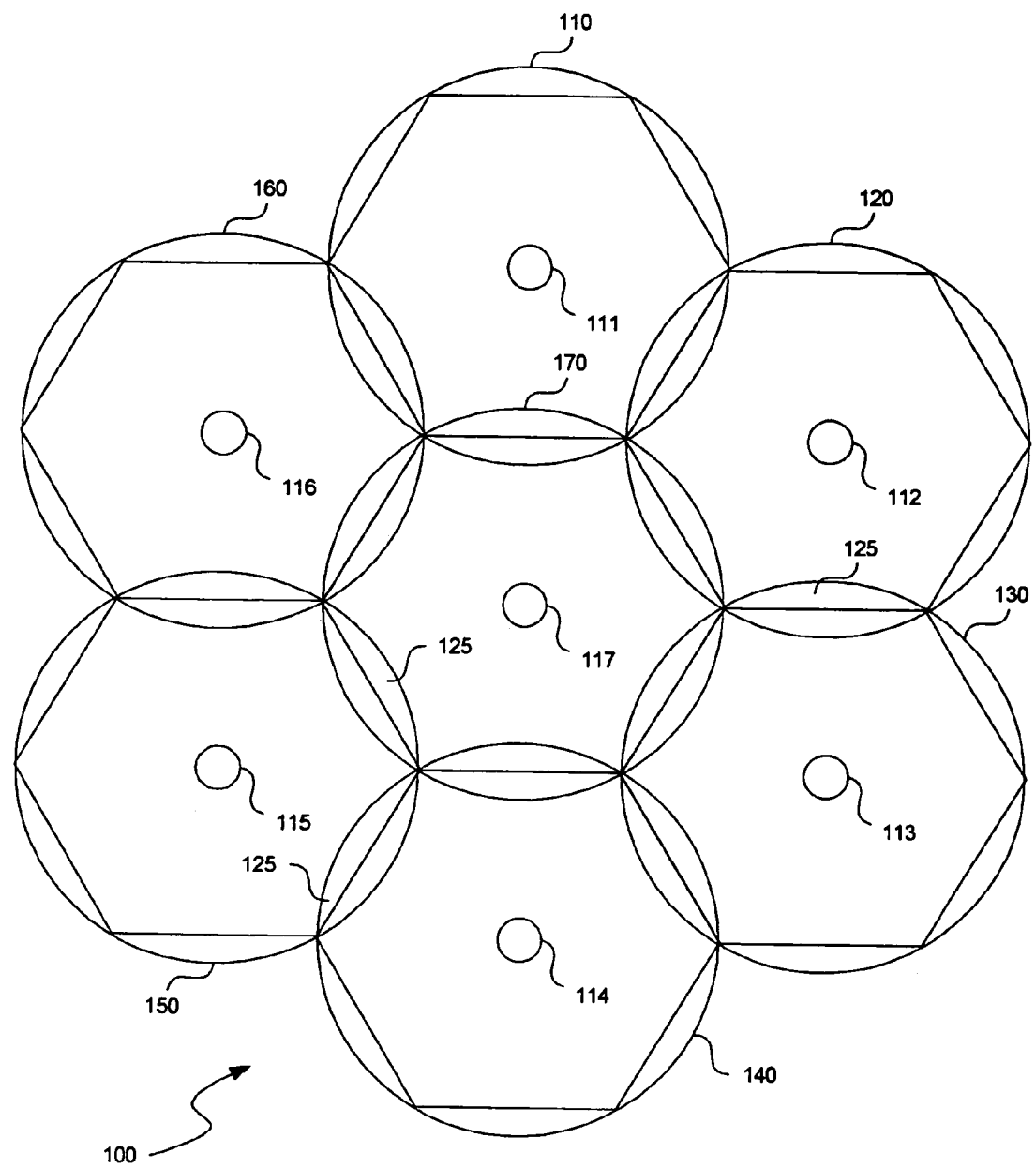
FIG. 1 is a schematic drawing showing theoretical base station coverage and overlap areas between neighboring base stations under one embodiment of the claimed invention.

In the drawings, the same reference numbers identify identical or substantially similar elements or acts. To easily identify the discussion of any particular element or act, the most significant digit or digits in a reference number refer to the Figure number in which that element is first introduced (e.g., element 404 is first introduced and discussed with respect to FIG. 4).

Figure numbers followed by the letters "A," "B," "C," etc. indicate that two or more Figures represent alternative embodiments or methods under aspects of the invention. The headings provided herein are for convenience only and do not necessarily affect the scope or meaning of the claimed invention.

DETAILED DESCRIPTION

A method for indicating the quality of the links between wireless base stations is described in detail below. In the following description, numerous specific details are provided to provide a thorough understanding of, and enabling description for, embodiments of the invention. One skilled in the relevant art, however, will recognize that the invention can be practiced without one or more of the specific details, or with other symbols, methods, etc. In other instances, well-known structures or operations are not shown, or are not described in detail, to avoid obscuring aspects of the invention.

At the simplest level, wireless communication takes place between a mobile unit ("MU") and a base station unit ("BSU"). This communication can take place at will as the MU moves throughout a region defined by the coverage area of the BSU. Coverage area is limited by environmental factors, technological limitations, structural characteristics, government regulations and the like. To overcome these limitations, several BSU's with limited range can be combined to form a network often referred to as a local area network. Arranging the BSU's in such a manner that their coverage: area overlaps allows a MU to extend its mobility by transferring, or handing off, its connectivity from one BSU to the next BSU. For this to take place each BSU, or alternatively a central controller, must know what other base stations are within handoff range. With this knowledge each base station can establish a station to station autonomous handoff without the necessity of a central system or network controller. Station to station autonomous handoffs require each base station to detect and communicate with other BSU's. In one embodiment of the claimed invention, the base station units ("BSUs") communicate with each other on a dedicated radio frequency or frequencies. Base stations can thereby detect one another and autonomously determine a list of "neighboring base stations". Each base station can then store the list of discovered neighboring base stations internally and update the list as conditions change. Further details regarding discovering lists of neighboring BSU's may be found in U.S. patent application No. 60/288,296, filed May 2, 2001 entitled "Wireless Base Station Neighbor Discovery in a Communication System, such as a System Employing a Short-range Frequency Hopping Scheme".

When necessary, each base station can access its list to identify BSU's that are candidates for a handoff of a MU during normal system operations. These candidates are referred to as "neighbors", "neighbor base stations," or "neighbor BSUs." For the sake of clarity, the term "neighbor BSU" is defined as a relationship between one BSU and other nearby BSUs, such that when a MU is linked to a primary BSU, the primary BSU can consult its list of "neighbors" and handoff the MU to the neighboring BSU without the MU experiencing any loss of signal. If such a handoff can occur, the two BSUs are neighbors. Likewise, the terms "base stations units," "base stations," "BSU", and "BSUs" are used interchangeably.

Establishing lists of neighbors is necessary when operating a wireless local area network due to the irregularities of the coverage area of individual BSUs and the links between them. As a MU approaches the edge of a coverage zone, the BSU identifies other neighboring base station units that overlap its own coverage in the vicinity of the MU and initiates a handoff operation. Based on the quality of the link between the BSU where the MU currently resides and the BSU accepting the MU coverage, different transfer protocols can be initiated. This ensures that the MU coverage is not severed needlessly because of a premature transfer, and that resources are not wasted during a transfer that is needlessly delayed. The overall size of the area covered by a network is facilitated by such links and the communication between the base station units.

The coverage of individual base stations, however, is not consistent. As described herein, coverage zones depend on environmental and structural effects such as the layout of a building, furniture located in the building, and amenities distributed throughout an area. Electromagnetic spectrums generated from other electronic devices can also affect the coverage zone of BSUs. The placement of the base station units is critical, therefore, to ensure that coverage areas overlap sufficiently to allow each base unit to establish a list of neighbors to facilitate MU handoffs. System and network managers monitor the placement and maintenance of such BSUs to ensure adequate coverage.

One embodiment provides network managers and the like a continuous real-time display of the link quality between base stations in a wireless network. This display enables managers to gain real-time feedback of the link quality between neighboring BSUs during initial installation. Furthermore, the displays allow a network manager to adjust the placement of the BSUs to overcome changes in the operating environment such as modifications in the floor plan of an office. In one embodiment, BSUs communicate continuously with their neighboring BSUs during normal operations. During such communications, a determination of the link quality between one BSU and its neighbors is determined. This link quality determination can be based on RSSI or other link quality indicators that include signal to noise ration ("SNR"), bit error rate ("BER") and the like, as well as any combination of these indicators.

Determining link quality using BER, for example, is accomplished when a packet, called a BER packet, is transmitted periodically between participating BSUs. Each BER packet transmitted among the participating BSUs is identical and known to each BSU. Since each BSU knows the contents of the BER packet, the presence of a cyclic redundancy check ("CRC") error can be used to trigger a count errors in the BER packet on a bit by bit basis. This count is used to determine the BER which is, therefore, simply a count of the bad bits over the total bits received during a period of time. From this count a history can be retained of errors associated with each neighboring BSU. The average BER over a pre-selected period of time can then be used to indicate the quality of the link between the measuring BSU and a neighboring BSU.

An alternative method of determining the link quality between neighboring BSUs is accomplished using normal communication packets. During communications, a CRC (or other error detection method) can be performed by a receiving BSU. If the predetermined BER is low enough between neighboring BSUs, the BSU receiving the packet with a CRC indicating bit errors can assume there is only one bit error in that packet. This is because the size of the communication packet is relatively small. The actual indication of BER would be inaccurate, but since the size of the communication packet is small the number of CRCs indicating bit errors indicates the relative quality of the link between the two BSUs. There are many ways of determining signal quality as those skilled in the relevant art will appreciate.

Once a BER, symbol error rate ("SER"), frame error rate "FER"), energy per symbol (or bit), signal to noise ration ("SNR"), received signal strength indication ("RSSI"), or other measurement metrics for neighboring stations has been determined, signal strength and other factors can be combined and normalized to form a common indication of link quality between base stations. This may be done by equating differing measuring scales. For example, when measuring the same link between BSUs, a BER of greater than 0.04% may be equivalent to a RSSI of less than −65.5 dBm. Likewise, a change in BER from 0.02 to 0.04 can be equated to a change in RSSI of 1.5 dBm. Different combinations of BSUs can develop measurement protocols to arrive at an accurate representation of the link quality. With each BSU maintaining an independent neighbor list, an accurate combined and normalized representation of the link quality can be generated and displayed at each BSU using either a logarithmic or liner scale. While a linear scale is typically easier to interpret, a logarithmic scale can provide more resolution when the quality is low, which is typically more important when managing the BSU link quality. The display used to depict this link quality can use a variety of formats, as described below.

FIG. 1 shows a schematic view of an array of base station units with overlapping coverage areas, under one embodiment of the claimed invention. The array of base stations 100 includes seven base station units 111–117. For each of the BSUs 111–117 there exits a coverage area depicted by a ring 110, 120, 130, 140, 150, 160 and 170. In this embodiment the distribution of the BSUs is symmetric and the coverage areas are represented by perfect circles. Such representations are for illustrative purposes only. Overlap regions 125 are formed where these areas intersect.

Each of the BSUs establishes a link with neighboring BSUs and evaluates the link quality between the opposing BSUs. If the link quality, measured as described herein, does not meet a pre-established limit, the neighboring BSU is not added to the neighbor list. If the link quality is sufficient, the BSU's identity is added to the neighbor list and stored either internally or by some other means. Furthermore, one BSU 112 may establish several links with other local BSUs 111, 113, 114, 116, and 117. Based on the overlap region and other factors, only the BSU's possessing adequate link quality 113, 117 and 111, will be added to the BSU's 112 neighbor list.

Figure 2:
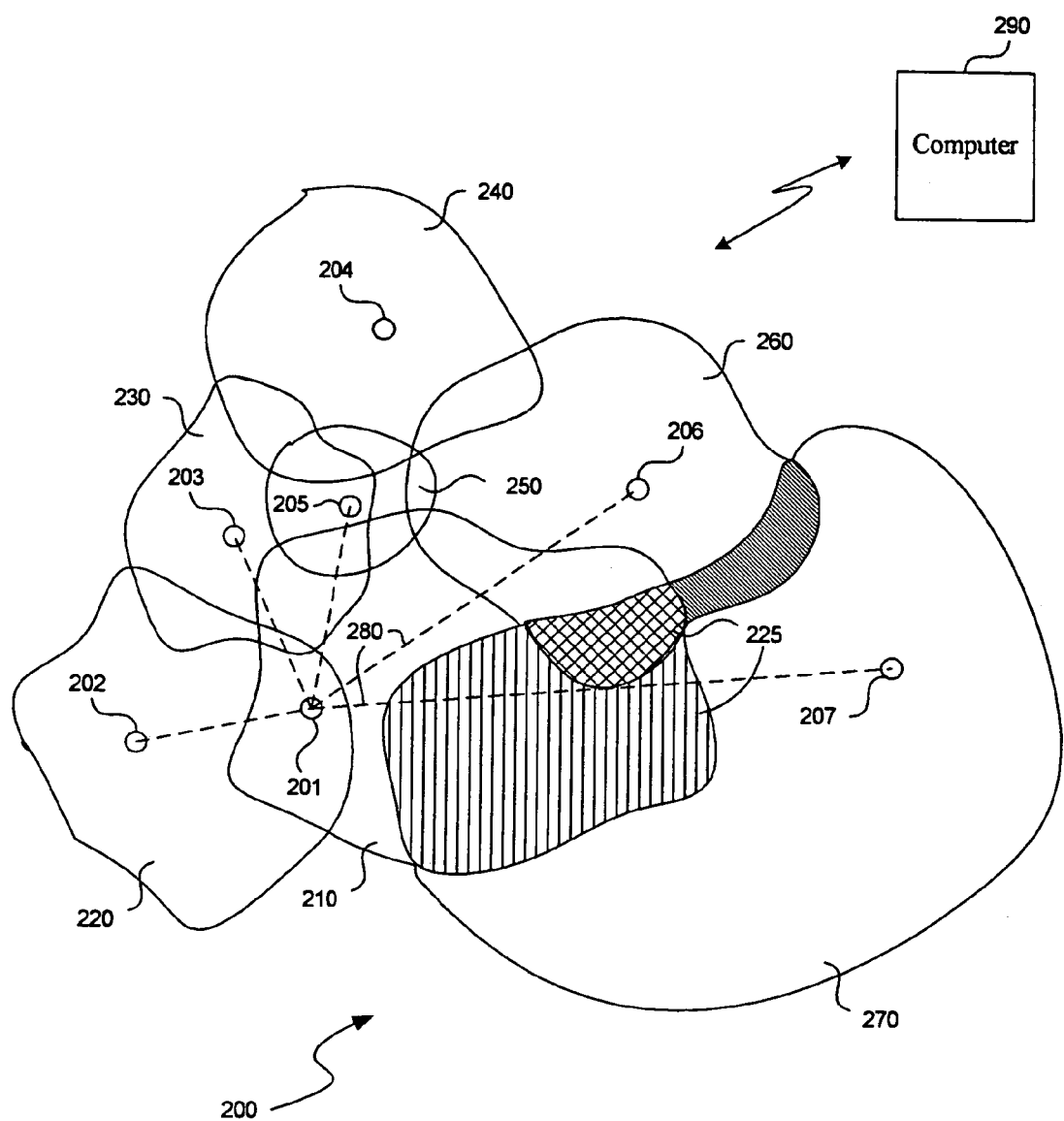
FIG. 2 is a schematic drawing showing irregular base station coverage and overlap areas between neighboring base stations.

FIG. 2 shows a schematic view of an irregular array of base station units with dissimilar overlapping coverage areas for one embodiment of the claimed invention. A base station network array 200 is often composed of nonsymmetrical orientation of BSUs 201–207 and irregular coverage areas 210, 220, 230, 240, 250, 260, and 270. These factors result in a variety of differing shaped overlap regions 225 which affect the link quality between the BSUs 201–207. As described herein, a single BSU 201 can establish links with neighboring BSUs 202, 203, 205, 206, and 207, based on a variety of link quality measurements.

Figure 3:
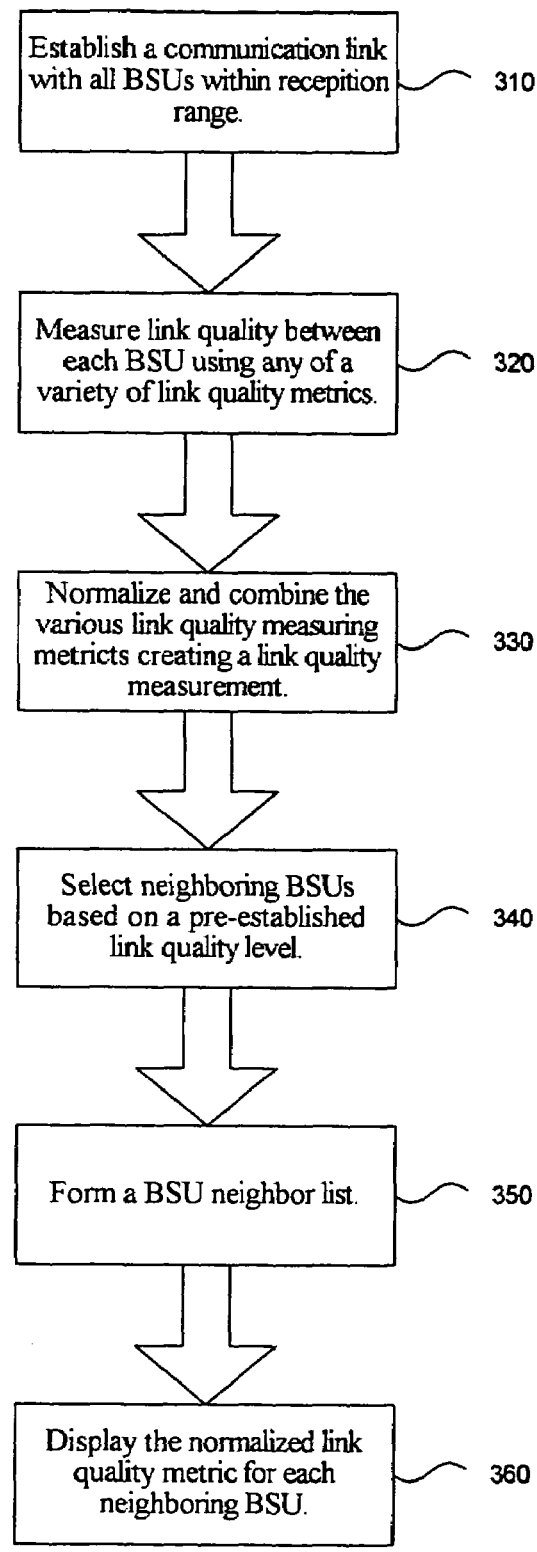
FIG. 3 is a flow diagram showing one embodiment of a process for determining and displaying the quality of links between neighboring base stations.

FIG. 3 is one embodiment of a flow diagram of a method for determining and displaying the link quality between neighboring BSUs. Unless described otherwise herein, the blocks depicted in FIG. 3 are well known or described in detail in the above cross-referenced provisional patent application. Indeed, much of the detailed description provided herein is explicitly disclosed in the provisional patent application; much of the additional material of aspects of the invention will be recognized by those skilled in the relevant art as being inherent in the detailed description provided in such provisional patent application, or well known to those skilled in the relevant art. Those skilled in the relevant art can implement aspects of the invention based on the flowchart of FIG. 3 and the detailed description provided in the provisional application.

As BSUs are configured in a network, they attempt to establish a communication link with any other BSU, under block 310. Upon establishing a communication link, the BSU begins to measure the quality of the link and determine the extent of the overlapped coverage area using one or more of the techniques and metrics described herein (block 320). Armed with data from one or more of the different metrics, the BSU normalizes the data and creates a link quality measurement, under block 330. Two or more methods of determining link quality can be combined and normalized to create a common link quality measurement. The common link quality scale can be non-dimensional to facilitate universal understanding and eliminate any misinterpretations. For example using a common scale of 0–10, 0 can represent a BER of greater than 0.1%, 1 can represent a BER of greater than 0.08% but less than 0.1% and so forth. A similar conversion can exist for RSSI measurements. Using this information, and criteria predetermined as acceptable levels of overlap coverage and link quality, each BSU can select neighboring BSUs under block 340 and develop an individualized neighbor list in block 350. From this list and the knowledge of the quality of the links, the BSU can display an indication of the common link quality measurement using one of a variety of different formats in block 360. With a communication link established and dedicated to measuring and maintaining link quality, the display of link quality between BSUs can be updated on a real time basis. Table 1 shows one embodiment of an equivalency listing between RSSI, BER, and a dimensionless Link Quality indicator. This table could be in the form of a look up table, implemented in software as a series of if-then statements, or various other methods.

TABLE 1

RSSI/BER/Link Quality Equivalency

| RSSI | BER | Resultant Link Quality |
|---|---|---|
| <−70 dBm | >0.1% | 0 or unacceptable |
| <−68.5 dBm | >0.08% | 1 or poor link quality |
| <−67 dBm | >0.06% | 2 |
| <−65.5 dBm | >0.04% | 3 |
| <−64 dBm | >0.02% | 4 |
| <−62.5 dBm | >0.008% | 5 |
| <−61 dBm | >0.006% | 6 |
| <−59.5 dBm | >0.004% | 7 |
| <−58 dBm | >0.002% | 8 |
| | | 9 indicates a very good link and covers all values greater than −58 dBM and less than 0.002% BER. |

FIGS. 4A–4F show different embodiments of display types indicating the link quality between BSUs. Each display is a depiction of the link quality between the hosting BSU, i.e. the BSU on which the displays are physically located, and the neighboring BSUs. While FIGS. 4A–4F show only a limited number of display units, the number should not be considered limiting in any fashion. In general, alternatives and alternative embodiments described herein are substantially similar to previously described embodiments, and common elements and acts or steps are identified by the same reference numbers. Only significant differences in construction or operation are described in detail.

The number of display units for each BSU can be adjusted to reflect the local conditions in order to properly represent the network of which the host BSU is a member. For example, in a network that includes 10 BSUs, each BSU may have a limited number of neighbors not to exceed 9. Therefore, if one BSU determines that three other BSUs qualify as neighbors, that BSU, referred to here as the host BSU, would only need three display units. If each BSU in this network was equipped with nine display units, the host BSU in this example could disable the remaining six display units to prevent confusion. A different BSU in the same network may have 5 BSUs that qualify as neighbors and likewise disable four display units. If, however, additional BSUs are added to the network and the original host BSU determines that, after the arrival of these new BSUs, it now has 5 neighboring BSUs, additional displays can be added or activated as the need arises. The disabling of display units may, of course, be performed automatically by the host BSU based on the number of neighboring BSUs on its stored list of neighbors. Alternatively, a technician could manually disable unused display units, such as via a hardware or software switch, or by means of a physical barrier to cover unused display units (e.g. optically opaque adhesive tape of window).

In all cases, the displays are coupled to processors and other circuitry in the BSUs. Thus, the BSUs drive the displays and provide an appropriate signal to cause such displays to output an appropriate display to a user, where such display visually represents neighbor BSU link quality. The displays may be provided on any portion of the BSU. For example, assume that the BSUs in a network are to be mounted in the ceiling of a building with the visual displays positioned at an exposed bottom surface of each BSU. Each BSU is then mounted in the building such that the bottom surface extends downwardly from the ceiling and is viewable by a user looking upward. Of course, the displays may be provided in other locations with respect to each BSU.

FIG. 4A is one embodiment of a display 400 showing link quality between base station units in a wireless network. The display 400 consists of six separate indicators arranged in a vertical bar formation 405 each comprising 8 segmented light emitting diodes ("LED") 410. The number of segments 410 can vary as needed for clarity and accuracy. Multi-colored LEDs can also be used, where each LED may emit two or more colors. Alternatively, each bar can include separate LEDs of 2–3 colors (e.g., two red LEDs at the bottom, followed by 3 yellow LEDs in the middle and 3 green LEDs at the top of each bar). Each vertical bar 405 represents one BSU, therefore the display 400 represents 6 neighboring BSUs.

As the LEDs illuminate they provide a relative indication of the quality of the link. One lighting scheme illuminates all the LEDs for a high quality link. As the link quality degrades, fewer LEDs are illuminated. Another version, noted above, uses colored LEDs where the lower LEDs are red, middle LEDs yellow, and the upper LEDs green. Other colors and combinations can be used as needed.

The display of yet another embodiment is scaled to represent actual values of the measurement metrics, such as BER or RSSI. Each LED segment, for example, can represent 0.02% BER. A display with three segments illuminated 430 represents >0.06% BER, while a display with four segments illuminated indicates >0.04% BER. In the same fashion the display can utilize a logarithmic representation. A printed scale (not shown) may be provided at the left or right side of the LED bars to represent such a scale.

Figure 4B:
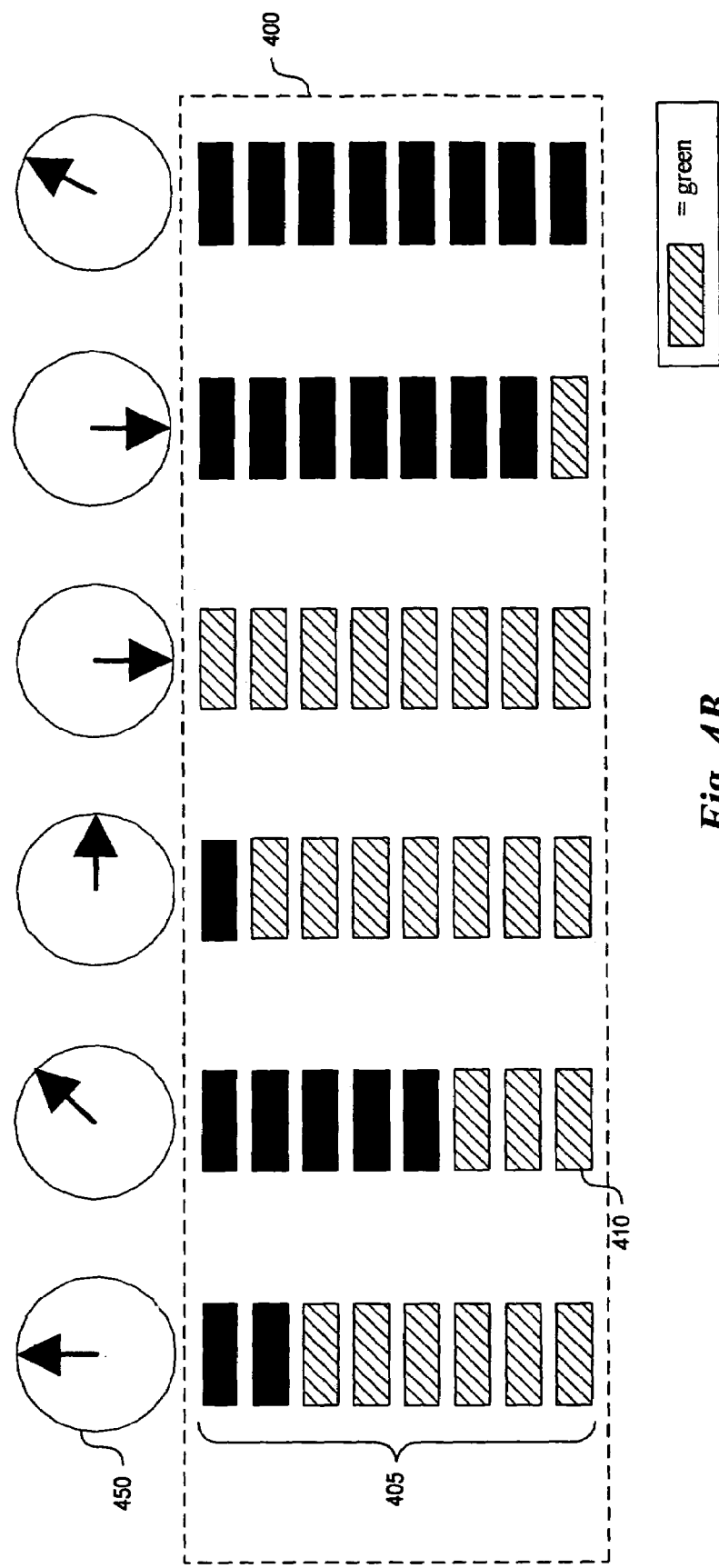

FIG. 4B is an embodiment of the display shown in FIG. 4A with additional directional indicators. Again, a LED display 400, composed of 6 vertical bar formations 405, represents the link quality of neighboring BSU. Associated with each vertical bar display 405 is a directional indicator 450 that the system user or administrator can orient to better facilitate his/her situational awareness as to the actual location of the linked BSU. These directional indicators may be manual set or in an alternate embodiment positioned automatically. Automatic positioning may be performed, e.g., by routing data back to the PSC, which in turn provides a corresponding position signal. As described herein the colors, sizes, and shapes of the displays can be altered to better meet the needs of the user.

Figure 4C:
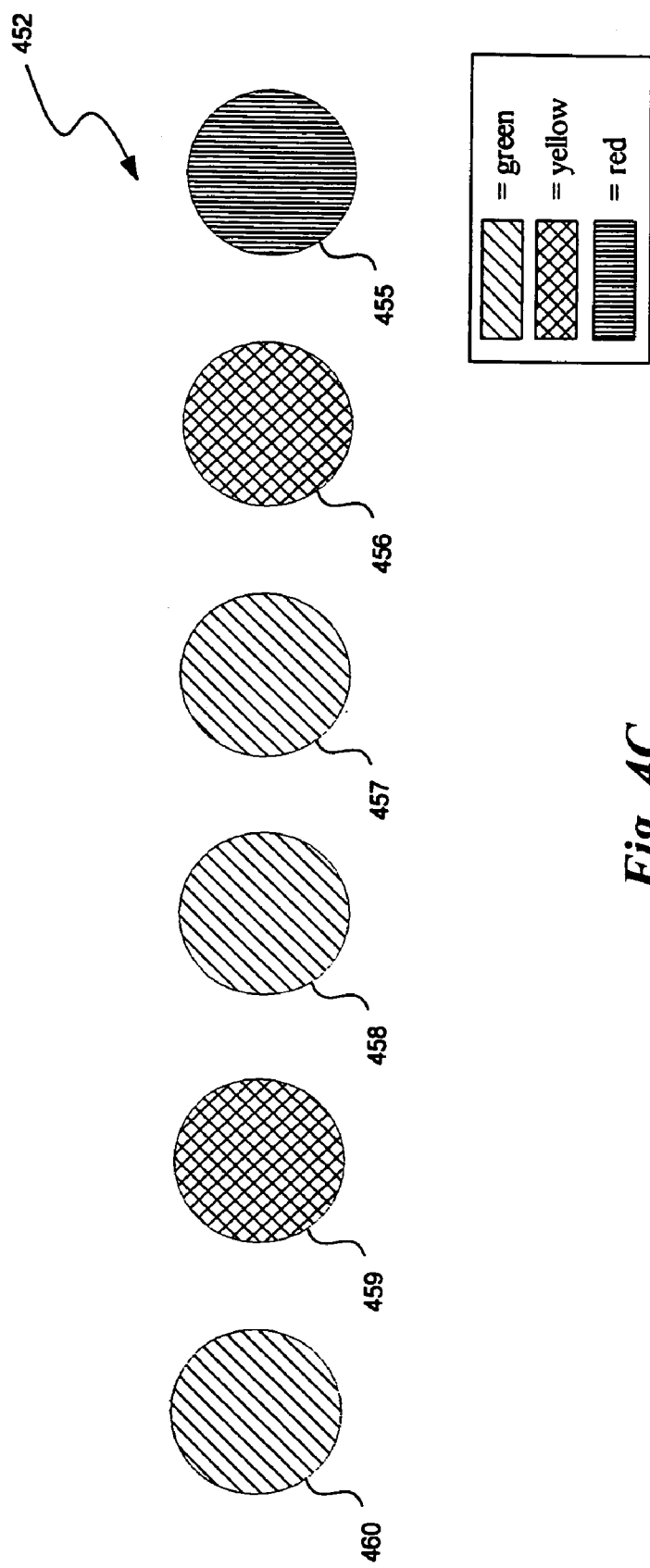

FIG. 4C is an alternative embodiment of a display, shown as a display 452, which is again used to represent the link quality between wireless base station units. In this embodiment, a single multi-colored LED 455–460 represents each neighboring BSU. As individual link qualities change, the respective LED's color shifts. Green can be used to represent an acceptable link quality range, yellow a marginal range, and red an unacceptable range of link quality.

Figure 4D:
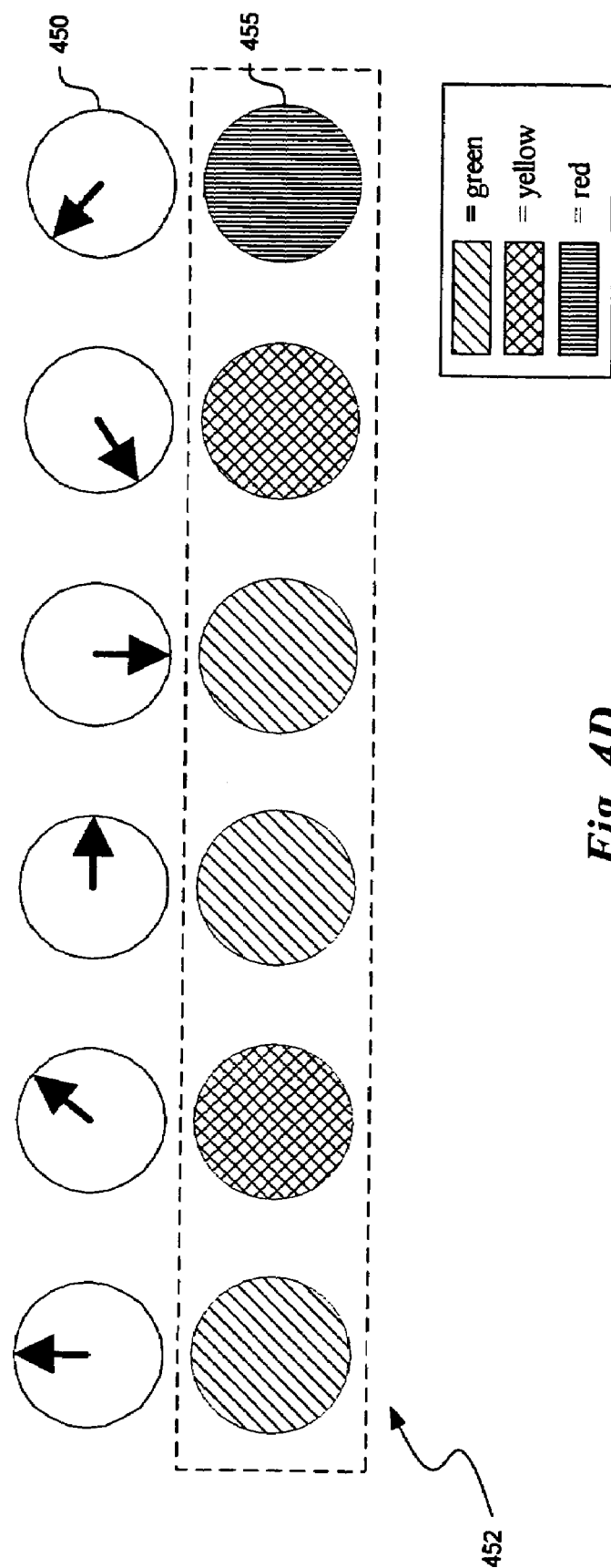

FIG. 4D is an alternative embodiment of the link quality display 452, which includes directional indicators 450. As described herein, directional indicators 450 can be associated with each BSU link quality display to orient the user to the neighboring BSUs associated with each of the LED's 455–460.

Figure 4E:
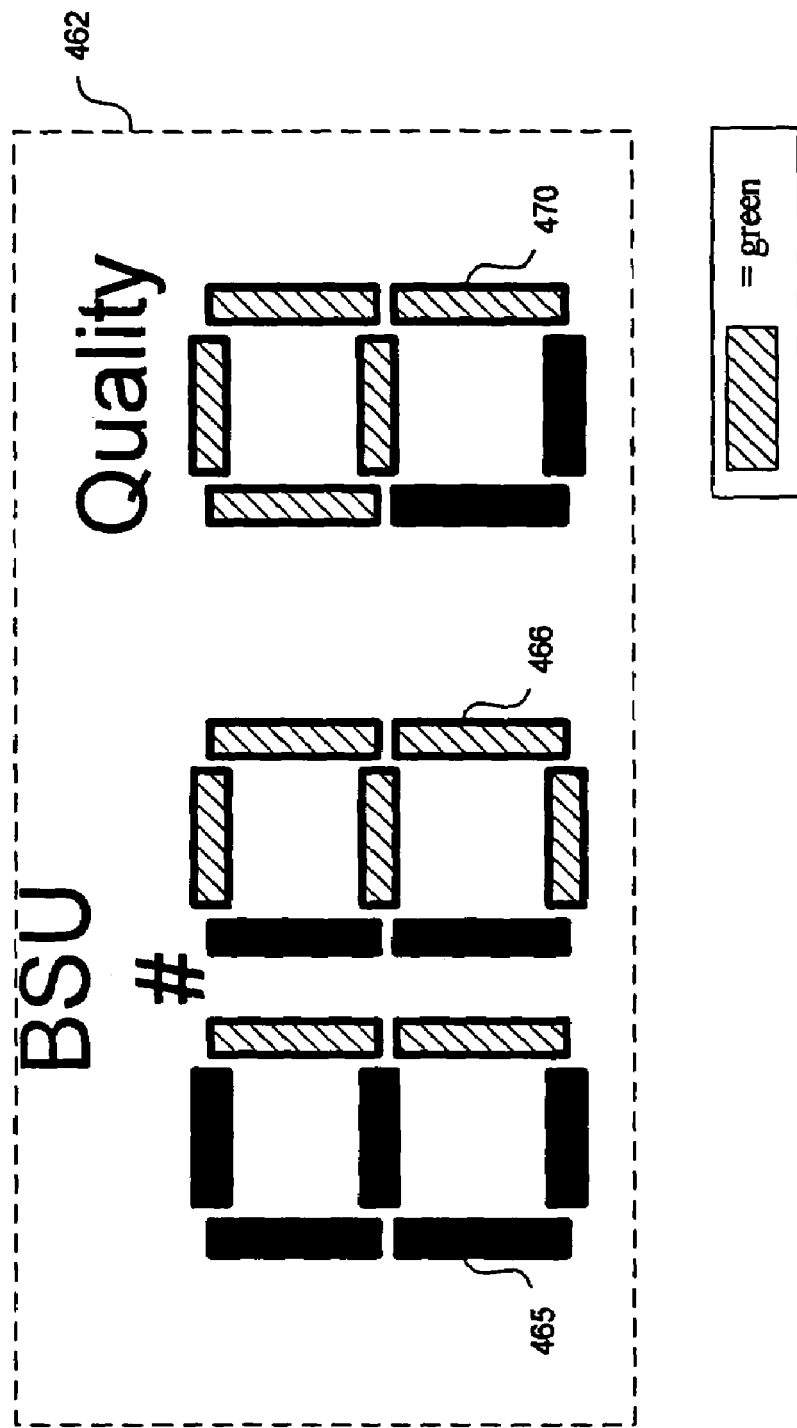

FIG. 4E shows an alternative display embodiment, shown as a display 462, that numerically displays link quality between wireless base station units using multiple LEDs. Three, seven segment LED configurations 465, 466, and 470, are used to represent all the neighboring BSUs. Each configuration 465, 466, and 470 is arranged in a figure-eight pattern, such that combinations of illuminated LEDs represent Arabic numerals. The first two configurations from the left 465, 466 represent the identifying number of a particular individual neighboring BSU (where such BSUs have predetermined numbers assigned to them). The remaining, or far right configuration, 470 indicates the link quality.

For example, the far left and center configurations 465, 466 of the numerical display 462 represent the numbers 1 and 3 respectively indicating BSU number 13, while the far right configuration 470 represents a link quality of nine. This conveys that neighboring BSU number 13 possesses a link quality of nine. The numerical display 462 can, in an alternative embodiment, cycle through displaying link quality with respect to each neighboring BSU, so that every 4 seconds or any other time period, the display 462 indicates a different BSU link quality. Furthermore, multiple numerical displays 462 can be provided on a single BSU to thereby provide simultaneous display of neighboring BSU link quality.

Figure 4F:
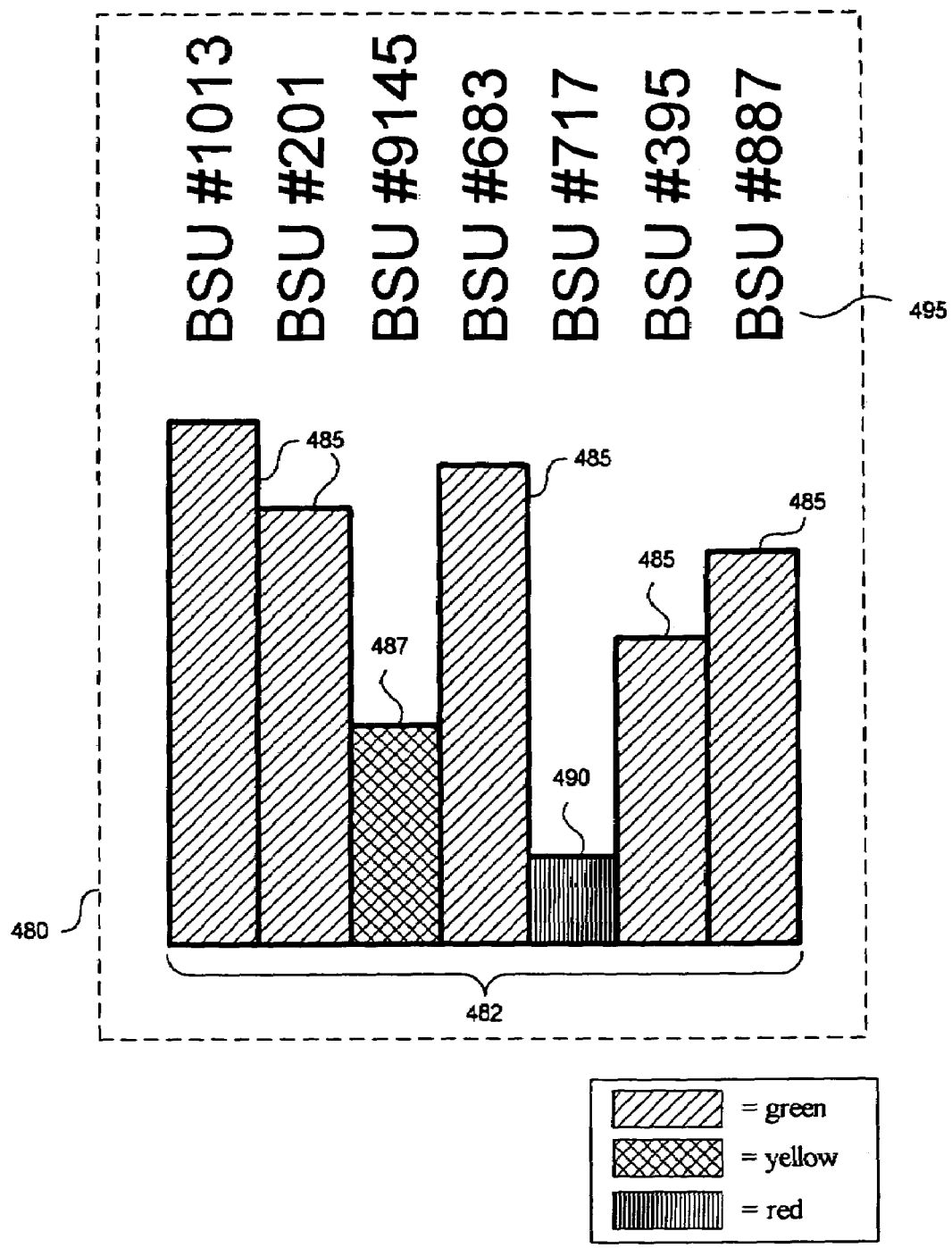

An additional embodiment of a link quality display 480 is shown in FIG. 4F. This display 480 presents a bar graph format using a liquid crystal display ("LCD") 482. Since the LCD 482 can be programmed to present any number of formats, it provides maximum flexibility to the user. In this embodiment a multi-colored bar graph is used to represent the link quality of each BSU. Lower quality links can be shown as a small red bar (e.g. bar 490), marginal links as an intermediate yellow bar (e.g. bar 487), and acceptable links as a taller green bar (e.g., bars 485). In addition, BSU identification information 495 reflecting a number for each neighboring BSU can be associated with, and provided above, each the link quality bar. Since the display is programmable, it can be altered to meet the individual needs of the network manager or administrator. Alternate embodiments use a personal data assistant, laptop, or similar device to display the link quality between BSUS.

The bar graph display 480 shown in FIG. 4F can be placed on every BSU or used in conjunction with a separate display unit. To facilitate a separate independent display unit, a computer 290 possessing a processor, can be coupled (wired or wirelessly) among the BSU network such that it can receive link quality information from all the BSUs in the network. The computer and the associated processor within computer can compile the BSU link quality information and convey the data to a laptop/palmtop or other user interface that could display a bar graph such as shown in FIG. 4F.

The link quality displays of each of the embodiments described thus far can be integrated into the individual BSUs. Each BSU possesses a display or displays that indicate the link quality of its neighboring BSUs. Neighboring BSU link quality can also, in another embodiment, be relayed to a central server or computer. The central server can analyze and store the information and if necessary supplement the information displayed at the individual BSUs. Each BSU can relay the link quality information to the server periodically, when the link quality falls below a certain predetermined level, or on a continuous basis. Alternate embodiments use this information to develop a system wide depiction of the link quality between neighboring BSUs.

Figure 5:
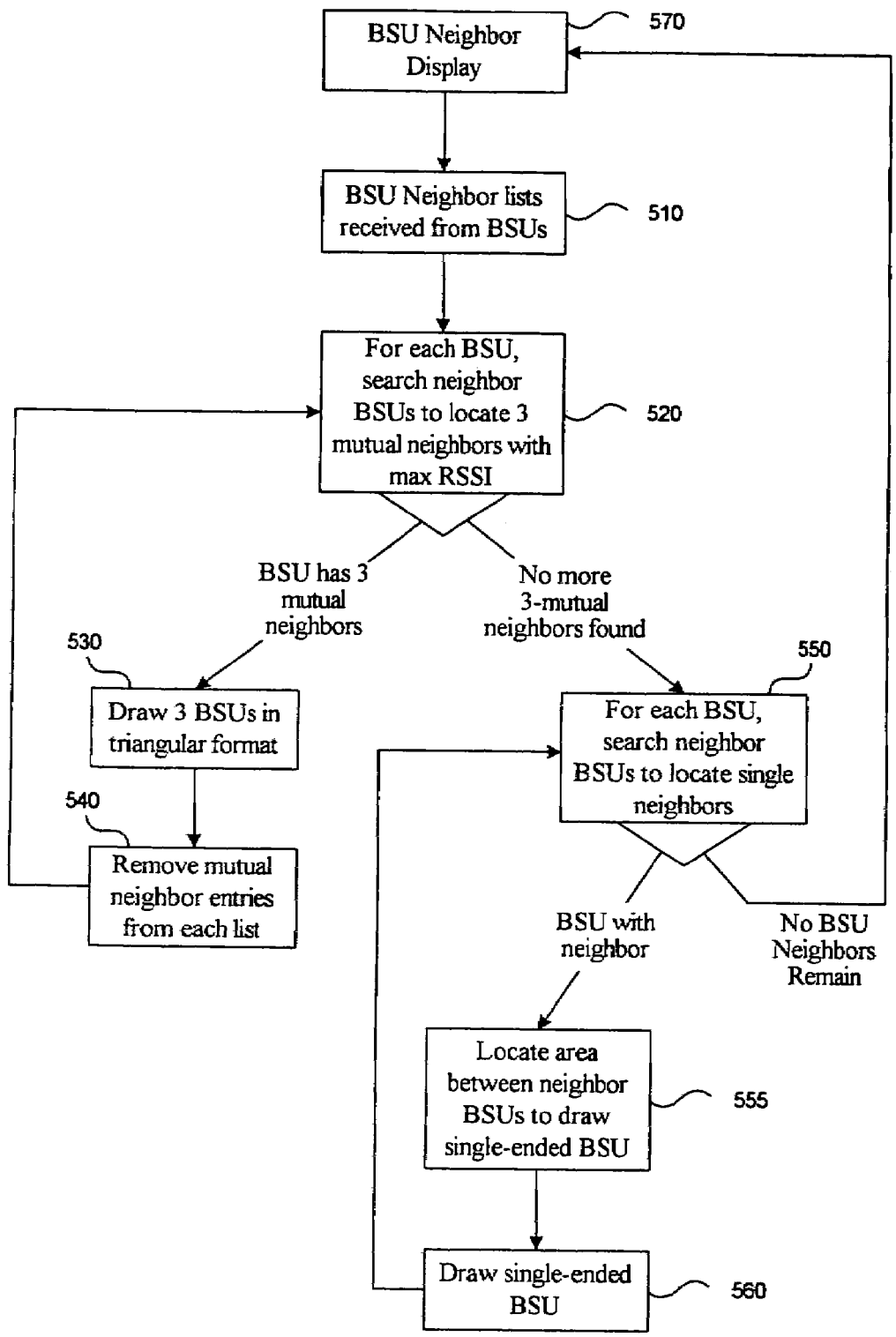
FIG. 5 is a flow diagram under one embodiment for determining the link quality relationship of base stations in a network governed by a central controller.

FIG. 5 is one embodiment of a flow diagram for developing a system wide depiction of link quality between neighboring BSUs. As described herein, each BSU develops and displays for each neighboring BSU a link quality. In the process of displaying a neighboring BSU's link quality, each BSU forms a neighbor list. This list is sent to a central personal or pocket network system controller ("PSC") forming a master BSU neighbor list under block 510. (An example of a network containing a PSC and BSUs may be found in Wireless Base Station Neighbor Discovery application noted above.) Upon receiving each BSU's neighbor list information, the PSC searches through all BSU lists and locates three BSUs that consider each other neighbors (block 520). These three mutual BSUs form the basis for a system wide display grid. If more than three BSUs consider each other neighbors (i.e., 4 BSUs consider each other neighbors), then the three BSUs with the greatest link quality values are chosen. Each BSU is considered independent. In other words, BSUs do not have to have a reciprocal neighbor relationship; e.g., if BSU-a considers BSU-b a neighbor, it is not necessary for BSU-b to consider BSU-a a neighbor.

The three mutual BSUs form a triangular relationship with each other in block 530. Using any one of the BSUs as a reference, the PSC creates a depiction of the three BSUs in a triangular formation with. In one embodiment, the PSC depicts the triangle segments proportional to the averaged mutual link quality between the BSUs. For simplicity, a finite number of inter-BSU segment lengths can be chosen. The number of segments, their length, and their proportion can be system configurabl As an example, each link between neighboring BSUs can be represented by a link ranging in length from 0 to 5 segments and each inter-BSU distance can be inversely proportional to the minimum of the mutual link quality measurement. Using 5 segment lengths where each segment is equal to 3 dB and further using RSSI as the link quality measurement yields: A RSSI of <−67 dB=5 segments, a RSSI of −67 to −64=4 segments, −64 to −61=3 segments, −61 to −58=2 segments, −58 to −53=1 segment, and >−53=0 segments. Therefore, a link between two BSUs having a RSSI of −66 dB would be depicted by two BSU symbols connected with 4 segments.

Furthermore, in another embodiment, each segment can be colored red, yellow, or green to indicate link quality as described above. The colors associated with RSSI thresholds could be system configurable, but as an example, the 5 segment lengths above could be colored red, 4 segment lengths colored yellow, and the remaining segments green.

Once the triangular formation is created, mutual references to the three BSUs included in the triangular formation are removed from the master BSU neighbor lists in block 540. This allows the PSC to eliminate the table entries as they are depicted on a display. The next BSU is chosen, and blocks 520, 530 and 540 repeated to depict additional BSUs and exclude BSUs just mapped.

Eventually, all BSUs with two or more mutual neighboring BSUs will have been drawn. Thereafter, in block 550, the PSC identifies any "single neighbor" BSUs. The single BSU neighbors identified in block 555 and depicted in block 560 with only a single segment connection. Blocks 550–560 can be system configurable to allow non-reciprocal relationships to be drawn in another color (i.e. yellow or gray) versus drawing them the same as reciprocal neighbors. Once the PSC has determined in block 550 that all neighbors on the list have been depicted, the PSC displays the BSU neighbors in the network under block 570. The PSC may periodically perform blocks 510–570 to update the BSU link display.

FIGS. 6A–6D illustrates an example of a series of displays produced from the method under FIG. 5 for indicating wireless base station link quality among neighboring base station units. FIGS. 6A–6D show an embodiment of a base station link quality display including a grid of base stations managed by a central controller orientated according to the quality of the links between the neighboring stations.

Figure 6A:
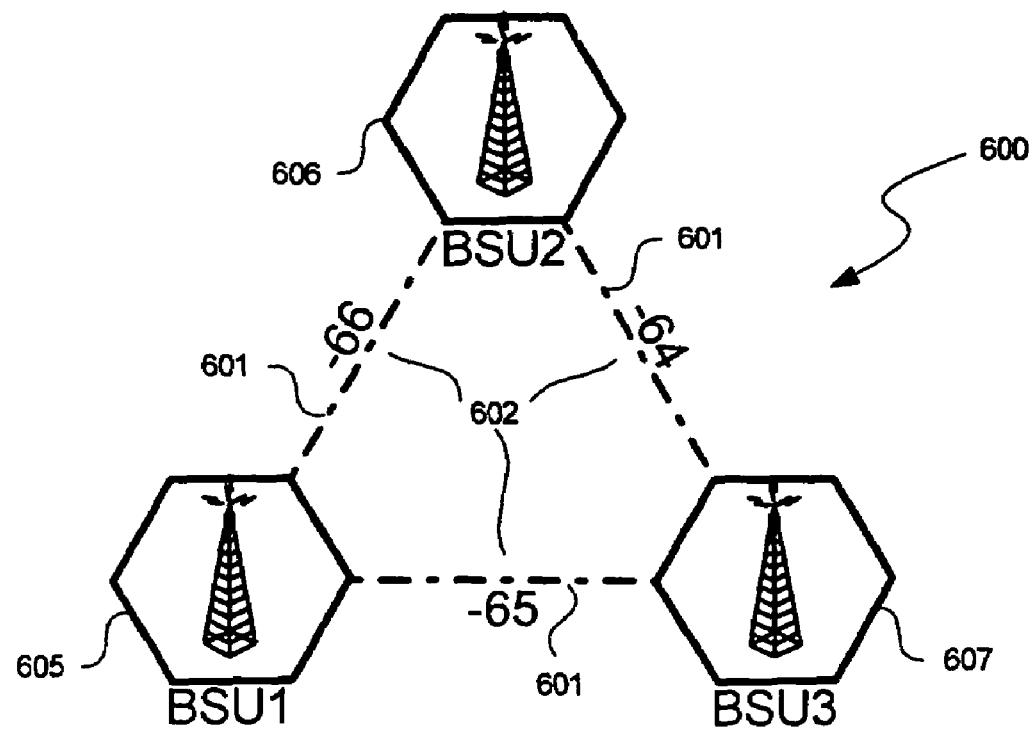
FIGS. 6A–6E are color figures of an embodiment of a base station link quality display showing a grid of base stations managed by a central controller orientated according to the quality of the links between the neighboring stations.

FIG. 6A shows a triangular formation 600 of three BSUs 605, 606, and 607 (which may be depicted under blocks 520–540). The three BSUs 605, 606, and 607 (BSU1, BSU2 and BSU3, respectively) are each coupled with a link segment 601 such that each segment 601 includes an indication of the link quality 602 superimposed on the link segment 601 for that BSU pair. (As an illustration of a previous embodiment, each segment could be of different length.) For example, in this embodiment, RSSI measurements are depicted indicating a link quality measurement of −66 dBm between BSU1 605 and BSU2 606. In order to expand the depiction, the neighbor lists of BSU1 605 and BSU2 606 are searched as indicated under blocks 520–540 to find any additional mutual BSUs while excluding BSU3 607.

Figure 6B:
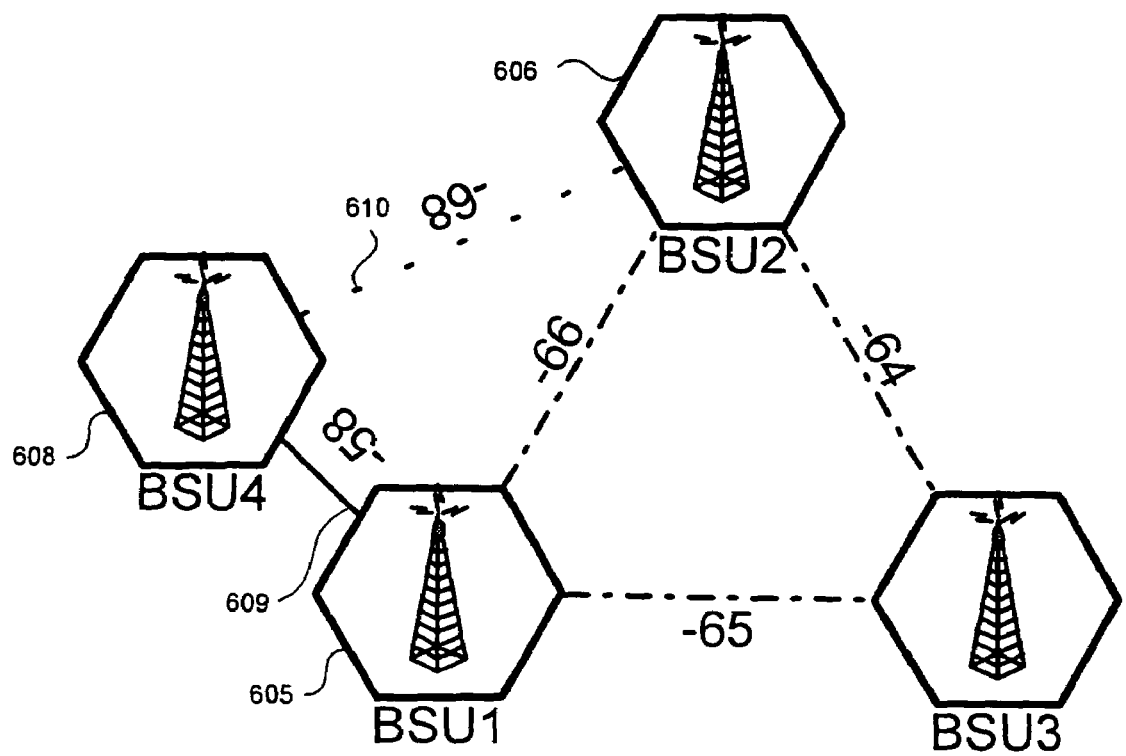

FIG. 6B shows the addition of BSU4 698 to the link quality display making a grid of four BSUs. The link between BUS1 605 and BSU4 608 is shown as a short segment 609. The length of the segment is inversely proportional to the quality of the link between the BSUs. Here a short segment length indicates a strong link between BSU1 605 and BSU4 608 while a long segment length 610 indicates a weaker link between BSU4 608 and BSU2 606. In other embodiments, the segments can be color coded, use differing line texture, or both, and with or without differing segment lengths to indicate link quality. In this embodiment, the link between BSU1 605 and BSU4 608 is depicted as a solid line 609 indicating a gook link quality. By comparison the link between BSU4 608 and BSU2 606 possesses a poor link quality and is represented by a dotted segment 610. A similar process continues until all the PSC identifies and depicts the mutual BSU neighbors of BSU1 605 under the routine of FIG. 5.

Figure 6C:
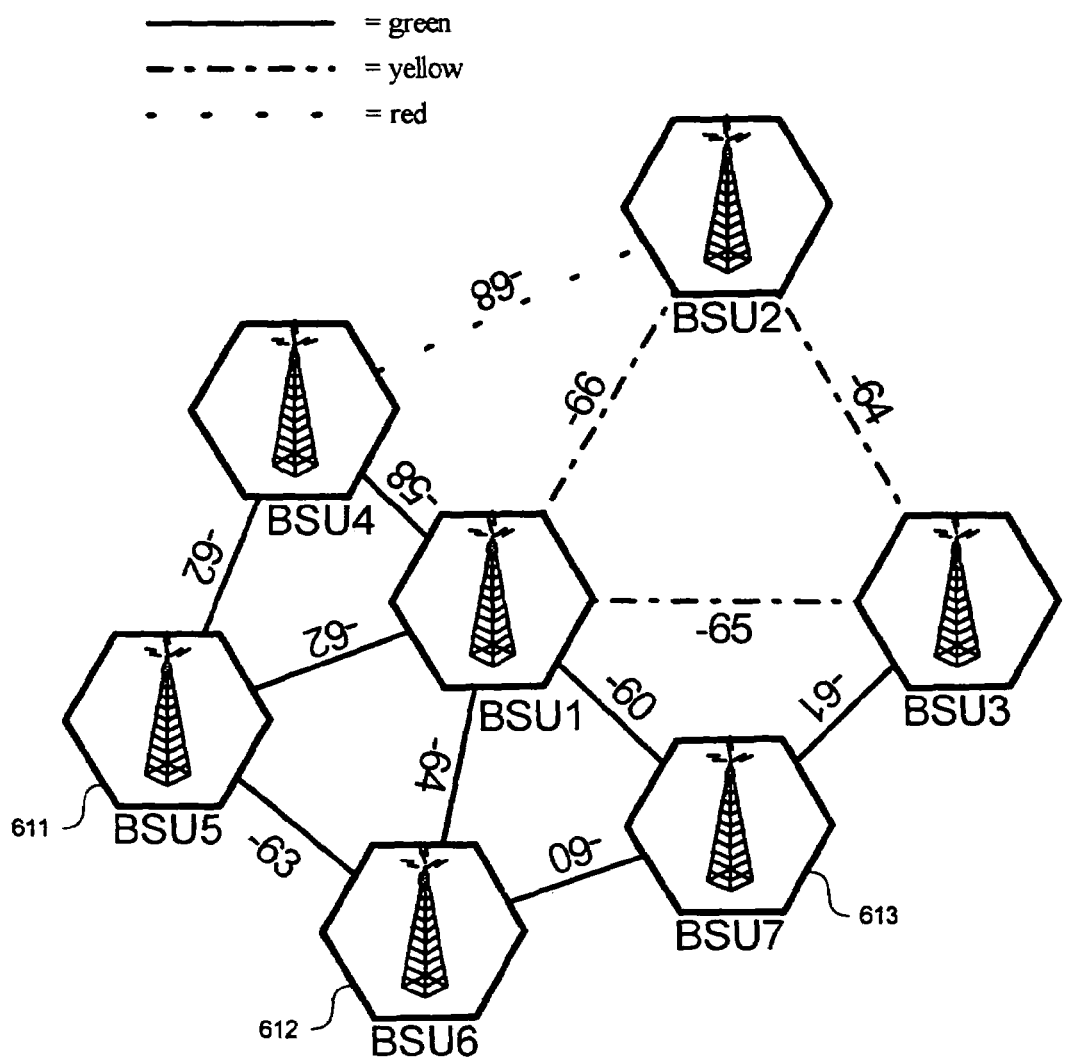

FIG. 6C shows a grid of seven BSUs coupled with differing segment lengths representing the link quality between the base stations. BSU5, BSU6 and BSU7, 611, 612, and 613 respectively, have been added to the diagram.

Figure 6D:
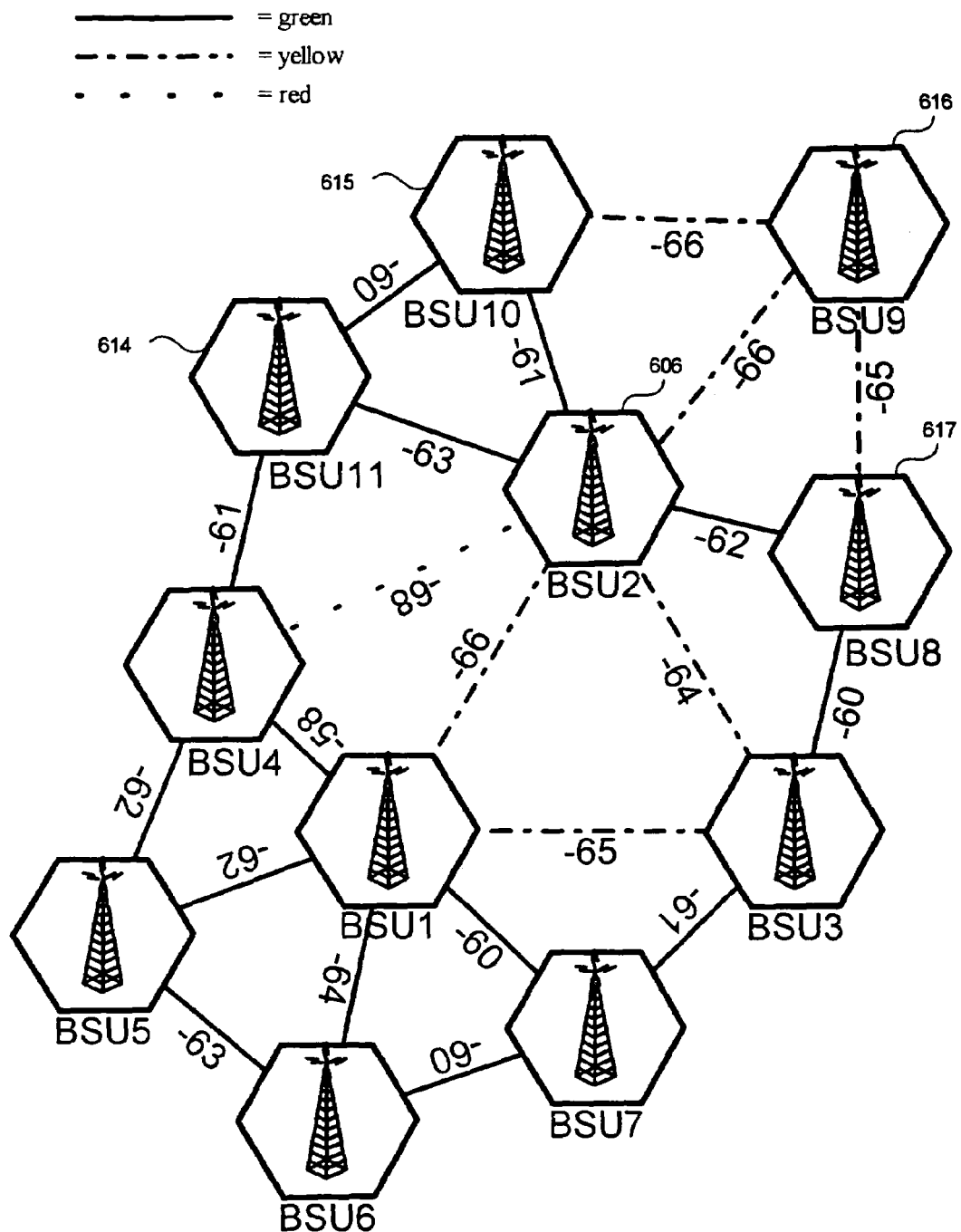

FIG. 6D furthers the process for indicating the link quality among neighboring wireless base stations by searching for mutual pairs. (depicted under blocks 520–540) Starting with BSU2 606, the embodiment depicted in FIG. 5 finds BSU11 614, BSU10 615, BSU9 616, and BSU8 617. Ultimately the process searches for mutual pairs from all the BSUs until the entire network of BSUs is formed. Having found all mutual pairs, single reciprocal and non-reciprocal neighbors are located and added to the grid. Once completed, the network or grid displaying the BSU network and associated link quality can be overlaid, in one embodiment, on a schematic of the physical environment. This is beneficial because it can associate a lower link quality with a particular region of a working area. This information can spur a reallocation of resources or an additional installation of base units. As th master list and link quality measurements are updated continuously, the grid maintains a real-time representation of the link quality between the base stations comprising a wireless network.

Figure 6E:
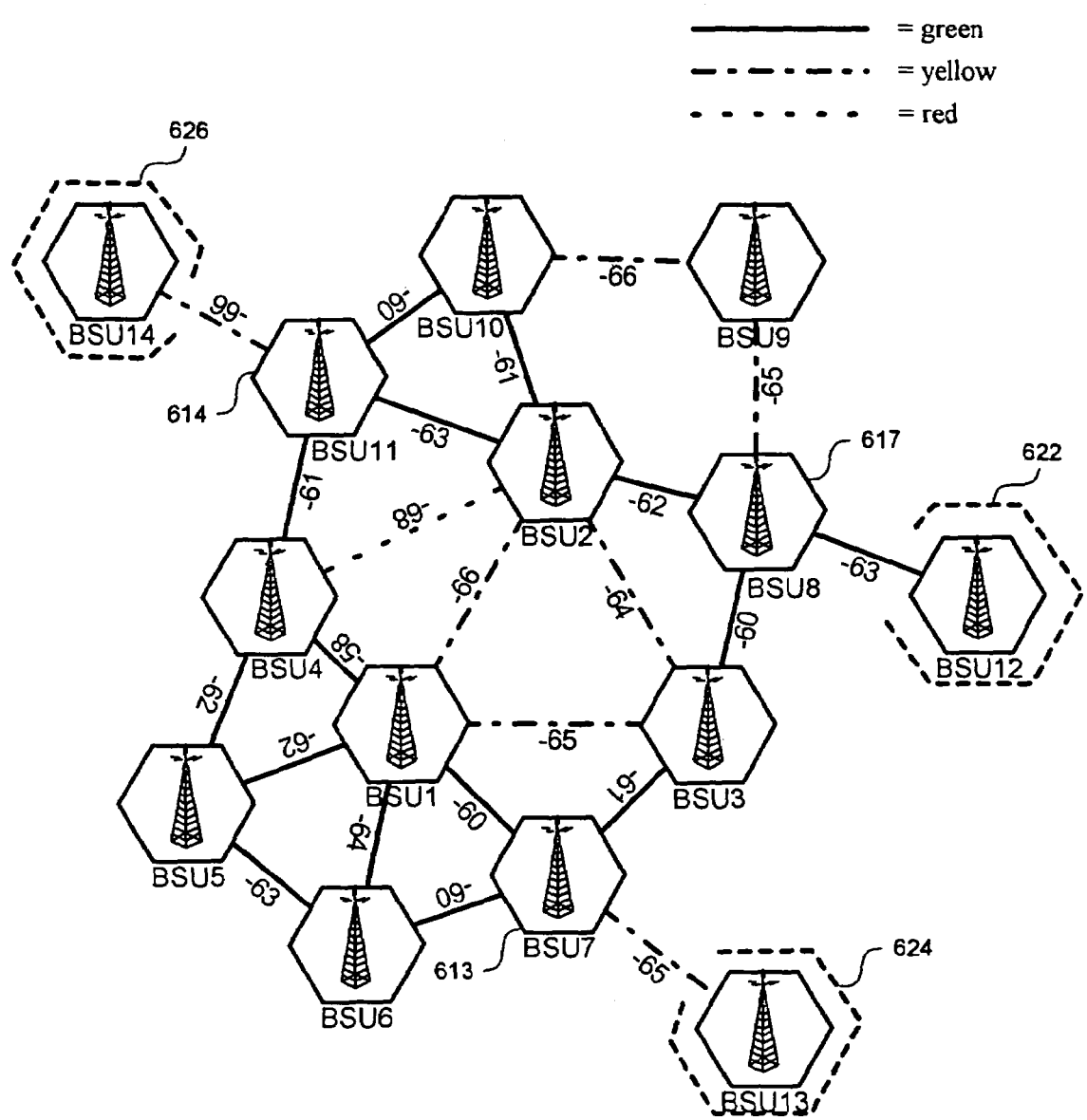

FIG. 6E completes the process begun in FIG. 6A for indicating link quality among neighboring wireless base stations by searching for single BSU neighbors. (which may be depicted under blocks 555 and 560) For each BSU established in the network and contained in a master network list (formed from neighbor lists), the system searches for single BSUs meeting the link quality specifications. In the network shown in FIG. 6E, BSU7, BSU8, and BSU11, (613, 617, and 614 respectively) has each determined that a single BSU possess a link quality sufficient to be shown in the network depiction. This determination is the result of finding and depicting all 3-mutual neighbor combinations as described above. The network is completed by indicating a link between BSU7 613 and BSU13 624, BSU8 617 and BSU12 622 and finally BSU11 614 and BSU14 626.

Throughout the description and the claims, unless the context clearly requires otherwise, the words "comprise," "comprising," and the like are to be construed in an inclusive sense as opposed to an exclusive or exhaustive sense; that is to say, in a sense of "including, but not limited to." Words using the singular or plural numb r also include the plural or singular number respectively. Additionally, the words "herein," "above," "below" and words of similar import, when used in this application, shall refer to this application as a whole and not to any particular portions of this application.

The above description of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. The teachings of the invention provided herein can be applied to other network systems, not only for the wireless network system described above. Furthermore, the elements and acts of the various embodiments described above can be combined to provide further embodiments.

Incorporated by reference herein are all above references, patents, or applications and the following U.S. applications, which are assigned to the assignee of this application: application No. 60/262,558, entitled Link Context Mobility, Such as for use in Wireless Networks; application No. 60/288,294, entitled Wireless System Base Station to Base Station Synchronization; application No. 60/288,270, entitled Method for Load Balancing Wireless Networks; application No. 60/288,301, entitled Frequency-Hopping Spread Spectrum Wireless Systems Interface Migration by Transmit Suppression; and application No. 60/288,300, entitled Visual Base Station to Wireless Link Quality Indicator. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A method for indicating quality of a wireless link among three or more wireless base stations, comprising:
    measuring at least one wireless link quality characteristic between a first wireless base station and at least two additional wireless base station, wherein the at least one wireless link quality characteristic is signal to noise ratio, bit error rate, or received signal strength indication;
    manipulating the link quality characteristic so as to form a common scale of link quality information for each of the two additional wireless base stations, wherein manipulating includes normalizing dissimilar link quality characteristic measurements;
    providing at least one display unit for each of the at least two additional wireless base stations, wherein the display units are provided on the wireless base station;
    displaying the common scale of link quality information for each of the at least one additional wireless base stations at the first wireless base station using the display units; and
    updating the common scale of link quality information on a real time basis.

2. A method for displaying the quality of a wireless link among two or more wireless base stations, comprising:
    measuring at least one link quality characteristic between a first wireless base station and at least one additional wireless base station repeatedly, with same or varying periods, wherein the first base station includes at least one display unit representing each of the at least one additional wireless base stations, wherein the measuring is performed after initial installation of at least one of the two or more wireless base stations;
    manipulating the at least one link quality characteristic so as to form a link quality information signal for each of the at least one additional wireless base stations; and
    displaying the link quality information signal for each of the at least one additional wireless base stations on the respective display unit.

3. The method of claim 2, wherein the at least one link quality characteristic is selected from a group that includes signal strength indication, bit error rate, and signal to noise ratio.

4. The method of claim 2, wherein manipulating includes normalizing the at least one link quality characteristic of the at least one additional base station.

5. The method of claim 2, wherein manipulating includes combining two or more of the at least one link quality characteristics of the at least one additional base station.

6. The method of claim 2, wherein the link quality information signal is a logarithmic scale.

7. The method of claim 2, wherein the link quality information signal is a linear scale.

8. The method of claim 2, further comprising:
    updating the link quality information signal on an approximate real time basis; and
    notifying a user when the link quality information signal is less than a predefined value.

9. The method of claim 2, wherein manipulating includes selecting a type of link quality characteristic used to form the link quality information signal.

10. The method of claim 2, wherein displaying includes providing a visual indication of the orientation of the at least one additional wireless base station relative to the first wireless base station associated with each of the at least one display unit.

11. The method of claim 2, wherein the at least one display unit includes light emitting diodes arranged in a vertical bar capable of displaying different values of the link quality information signal.

12. The method of claim 2, wherein the at least one display unit includes a liquid crystal display capable of displaying at least one link quality characteristic, and wherein the liquid crystal display is capable of identifying the at least one additional wireless base stations associated with the at least one link characteristic.

13. A method for indicating the quality of a wireless link among two or more wireless base stations, comprising:
    at least periodically and at a first wireless base station, measuring at least one link quality indicator between the first wireless base station and at least one neighboring wireless base station, wherein the measuring is performed at least after initial installation and during normal operation of the wireless base stations; and
    at the first wireless base station, providing a visual display for a user; and at least periodically, displaying the at least one link quality indicator for neighboring wireless base stations on the visual display.

14. A system for showing quality of a wireless link, comprising:
    two or more wireless base stations coupled to form at least one communications link, wherein each of the two or more wireless base stations includes at least one display device representing every other base station, wherein each of the two or more wireless base stations is capable of:
        measuring at least one link quality characteristic with respect to communications among each of the two or more wireless base stations;
        manipulating the at least one link quality characteristic so as to form a link quality information signal; and
        directing the at least one display device to display an indication of a quality of the communication among each of the two or more wireless base stations based on the link quality information signal for each of the two or more wireless base stations.

15. The system of claim 14, wherein each of the at least one display device, associated with on other base station, is a stacked bar of multicolored light emitting diodes ("LED"), a stacked bar of LEDs that emit only one of two colors, a liquid crystal display or a single multicolored LED.

16. The system of claim 14, further comprising normalizing dissimilar link quality characteristic measurements.

17. The system of claim 14, wherein directing includes updating the common scale of link quality information on an approximately real time basis.

18. The system of claim 14, further comprising at least one mobile wireless device that displays the link quality information signal of the two or more wireless base stations.

19. A method for displaying wireless link quality among networked wireless base stations, comprising:
    receiving at least one link quality characteristic from the two or more wireless base station at a communications network system controller, wherein the at least one link quality characteristic is selected from a group including received signal strength indication, bit error rate, frame error rate, symbol error rate, and signal to noise ratio, and wherein the at least on link quality characteristic is measured at each of the two or more wireless base stations;

at the network system controller, manipulating the at least one link quality characteristic so as to form at least one link quality information signal;

receiving, at the network system controller, an indication of wireless base station neighbors from the two or more wireless base stations;

at the network system controller, associating the at least one link quality information signal with certain wireless base stations in the indication of wireless base station neighbors and producing a display signal; and at the network system controller, outputting the display signal to the certain wireless base stations in the indication of wireless base station neighbors, wherein the certain wireless base stations display an indication of the link quality characteristic based on the display signal and wherein outputting includes providing an approximate real time indication of the link quality information among the two or more wireless base stations at the two or more wireless base stations.

20. The method of claim 19, wherein the certain wireless base stations display a schematic associating a location of the two or more wireless base stations with link quality among the two or more wireless base stations.

21. The method of claim 19, further comprising notifying a user when the common scale of link quality information is less than a predefined value.

22. A wireless base station coupled among at least one additional wireless base station in a communication network, comprising:
    a wireless transceiver for communicating with mobile units and the at least one additional wireless base station;
    a display device; and
    at least one processor coupled to the wireless transceiver and the display device, wherein the processor is configured to:
        measure at least one link quality characteristic of at least one link with the at least one additional wireless base station repeatedly, with or without varying periods, wherein the display device includes at least a portion representing each of the at least one additional wireless base stations, and wherein the measuring is performed during normal operation of the wireless base station;
        manipulate the at least one link quality characteristic so as to form a link quality information signal for each of the at least one additional wireless base stations; and
        display the link quality information signal for each of the at least one additional wireless base stations on the display device representing each of the at least one additional wireless base stations.

23. A computer-readable medium whose contents cause a display device to indicate the link quality between wireless base stations, the method comprising:
    measuring at least one link quality characteristic between a first wireless base station and at least one additional wireless base station at least once, wherein the first base station includes a display device, wherein at least a portion of the display device represents each of the at least one additional wireless base stations;
    manipulating the at least one link quality characteristic so as to form a link quality information signal for each of the at least one additional wireless base stations; and
    displaying the link quality information signal for each of the at least one additional wireless base stations on the display device representing each of the at least one additional wireless base stations.

24. In a wireless communications network including two or more wireless base stations, wherein at least one wireless mobile device communicates with at least a portion of the network, an apparatus for indicating link quality among the two or more wireless base stations, comprising:
    means for periodically or sporadically measuring at least one link quality characteristic between a first wireless base station and at least one additional wireless base station, wherein the first base station includes a display device representing each of the at least one additional wireless base stations;
    means for manipulating the at least one link quality characteristic so as to form a link quality information signal for each of the at least one additional wireless base stations; and
    means for displaying the link quality information signal for each of the at least one additional wireless base stations on the display device representing each of the at least one additional wireless base stations, wherein the measuring is performed at least after installation of the wireless base stations.

25. A system for indicating the quality of a wireless links among networked wireless base stations, comprising:
    three or more wireless base stations coupled to form a communication network, wherein each of the three or more wireless base stations identifies neighboring wireless base stations linked to each of the three or more wireless base stations, and wherein the identification includes at least one link quality measurement for each linked wireless base station; and
    a communications network system controller capable of:
        receiving, at the network system controller, an indication of neighboring wireless base stations from each of the three or more wireless base stations;
        associating, at the network system controller, the at least one link quality measurement with certain wireless base stations in the indication of wireless base station neighbors;
        manipulating, at the network system controller, the at least one link quality measurement associated with the certain wireless base stations in the indication of wireless base station neighbors so as to form a link quality information signal;
        searching, at the network system controller, for each of the three or more wireless base stations at least two or more neighboring wireless base stations;
        selecting, at the network system controller, from the at least two or more neighboring wireless base stations, two wireless base stations possessing the highest value of the at least one link quality measurement;
        forming, at the network system controller, at least one triangular cell of wireless base stations, wherein the at least one triangular cell includes at least one of the three or more wireless base stations and the associated two wireless base stations possessing the highest value of the at least one link quality measurement for the at least one of the three or more wireless base stations;
        removing, at the network system controller, mutual entries of wireless base stations from the indication of neighboring wireless base stations from each of the wireless base stations forming the triangular cell, wherein each triangular cell includes a wireless base station at each node coupled by a first segment between each node, wherein the length of the first segment is proportional to the common scale of link quality information;

locating, at the network system controller, single neighbor wireless base stations for each of the three or more wire wireless base stations; and combining, at the network system controller, the at least one triangular cells of wireless base stations forming a grid of wireless base stations, wherein the grid includes the single neighbor wireless base stations connected to the grid of wireless base stations by a second segment between each node, wherein the second segment is proportional to the link quality information signal.

26. A method for indicating the quality of links among wireless base stations in a network, comprising:

receiving, at a communications network system controller, an indication of wireless neighboring base stations from each of three or more wireless base stations, wherein the indication of wireless neighboring base stations includes at least one link quality measurement;

associating, at a communications network system controller, the at least one link quality measurement with certain wireless base stations in the indication of wireless base station neighbors;

configuring, at a communications network system controller, a display device, wherein the display includes triangular cells of wireless base stations, each triangular cell representing three mutually linked wireless base stations such that the link quality measurement of the three mutually linked wireless base stations is optimized, and wherein each triangular cell includes three nodes coupled together by three segments such that a different node represents each of the three mutually linked wireless base stations, and such that a different segment represents each of the three links between the three mutually linked wireless base stations;

removing, at a communications network system controller, from the indication of wireless neighboring base stations of the three mutually linked wireless base stations, the identity of wireless neighboring base station included in the triangular cell;

depicting, at a communications network system controller, the at least one link quality measurement between the three mutually linked wireless base stations such that each segment length between each node represents and is proportional to the link quality between each of the three mutually linked wireless base stations; and adding, at a communications network system controller, a single node to the display representing a wireless base station that is linked to only one other wireless base station, wherein the node is coupled to the display with a single segment such that the segment length represents and is proportional to the link quality between the single node and the one other wireless base station.

* * * * *

UNITED STATES PATENT AND TRADEMARK OFFICE
CERTIFICATE OF CORRECTION

| | |
|---|---|
| PATENT NO. | : 7,076,274 B2 |
| APPLICATION NO. | : 10/701370 |
| DATED | : July 11, 2006 |
| INVENTOR(S) | : Jollota et al. |

It is certified that error appears in the above-identified patent and that said Letters Patent is hereby corrected as shown below:

Column 10
Line 33, "configurable As" should be --configurable. As--

Column 12
Line 21, "numb r" should be --number--;

Signed and Sealed this

Twenty-sixth Day of December, 2006

JON W. DUDAS
*Director of the United States Patent and Trademark Office*